United States Patent
Mariasoosei et al.

(10) Patent No.: US 9,930,584 B2
(45) Date of Patent: Mar. 27, 2018

(54) ALLOCATION OF PHYSICAL CELL IDENTIFIERS IN CELLULAR NETWORK

(71) Applicant: Altiostar Networks, Inc., Tewksbury, MA (US)

(72) Inventors: Collins Mariasoosei, Tiruchirappalli (IN); Manikanta Kamisetty, Kamalapuram (IN); Prasad Palakuri, Chittoor (IN)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/950,675

(22) Filed: Nov. 24, 2015

(65) Prior Publication Data

US 2017/0150407 A1    May 25, 2017

(51) Int. Cl.
*H04W 36/00*    (2009.01)
*H04W 36/32*    (2009.01)
(Continued)

(52) U.S. Cl.
CPC ....... *H04W 36/0083* (2013.01); *H04W 16/02* (2013.01); *H04W 24/02* (2013.01); *H04W 36/32* (2013.01); *H04W 88/08* (2013.01)

(58) Field of Classification Search
CPC ..... H04W 36/08; H04W 36/30; H04W 24/10; H04W 36/22; H04W 72/042; H04W 76/021; H04W 88/08; H04W 36/0083
(Continued)

(56) References Cited

U.S. PATENT DOCUMENTS

2010/0020710 A1*  1/2010  Gupta .................. H04J 11/0093
                                                                370/252
2011/0038326 A1*  2/2011  Davies .................... H04W 8/26
                                                                370/329
(Continued)

FOREIGN PATENT DOCUMENTS

WO    WO-2014086397 A1    6/2014
WO    WO-2014120056 A1    8/2014

OTHER PUBLICATIONS

European Search Report for Application No. 16020461.6 dated Sep. 18, 2017.
(Continued)

*Primary Examiner* — William Nealon
(74) *Attorney, Agent, or Firm* — Mintz Levin Cohn Ferris Glovsky and Popeo, P.C.

(57) ABSTRACT

Data characterizing a sector to assign a physical cell identifier (PCID) is received, the sector being associated with a base station in a communications network. A reuse distance for each of the PCIDs in the set of PCIDs presently available to the sector for assignment is determined based on a set of PCIDs presently available to the sector for assignment. The reuse distance is a distance between the sector and a nearest sector having the PCID. A PCID having a largest reuse distance of PCIDs having a physical layer identifier (ID) being different from a physical layer ID of at least another sector associated with the base station is selected based on the determined reuse distance for each PCID in the set of PCIDs presently available to the sector for assignment. The selected PCID is assigned to the sector. Related apparatus, systems, techniques, and articles are also described.

33 Claims, 9 Drawing Sheets

(51) Int. Cl.
*H04W 16/02* (2009.01)
*H04W 24/02* (2009.01)
*H04W 88/08* (2009.01)

(58) Field of Classification Search
USPC .......................................................... 455/436
See application file for complete search history.

(56) References Cited

U.S. PATENT DOCUMENTS

| 2011/0086652 | A1* | 4/2011 | So | H04W 24/02 |
| | | | | 455/501 |
| 2011/0190000 | A1* | 8/2011 | Kwun | H04W 72/00 |
| | | | | 455/450 |
| 2014/0073304 | A1* | 3/2014 | Brisebois | H04W 24/02 |
| | | | | 455/418 |
| 2014/0369285 | A1* | 12/2014 | Li | H04W 24/02 |
| | | | | 370/329 |
| 2015/0319624 | A1* | 11/2015 | Garcia | H04W 8/26 |
| | | | | 370/329 |

OTHER PUBLICATIONS

Qualcomm Europe et al., Automatic Physical Cell Identity Slection in LTE: Requirements and Solutions. 3GPP TSG-RAN WG3 #60. May 5-9, 2008;1-4.

Vadada, H. LTE PCI Planning. Sep. 2010;1-13. <http://www.telecom-cloud.net/wp-content/uploads/2010/09/PCI-Planning-for-LTE.pdf>.

Yu et al., A Physical Cell Identity Self-Organization Algorithm in LTE-Advanced Systems. 2012 7th International ICST Conference on Communications and Networking in China. IEEE. Aug. 8, 2012;576-80.

* cited by examiner

ALLOCATION OF PHYSICAL CELL IDENTIFIERS IN CELLULAR NETWORK

TECHNICAL FIELD

The subject matter described herein relates to allocating physical cell identifiers (PCID) in cellular networks, for example, a long-term evolution network.

BACKGROUND

A physical cell identifier (PCID) is an identification of a sector or cell at the physical layer. The Primary Sync Signal (PSS) or physical layer ID and the Secondary Sync Signal (SSS), which is a physical layer cell ID group number, determine the PCID. In some networks, the physical layer ID can have values between zero and two, while the cell ID group number can have values between 0 and 167. The PCID can be determined from the physical layer ID and the physical layer cell ID group number as three times the cell ID group number plus the physical layer ID number. Thus, the PCID can take values between 0 and 503.

Downlink reference signal is a signal that exists at the physical layer. The downlink reference signal delivers a reference point for downlink power. When a user equipment (UE) attempts to determine downlink power (e.g., the power of the signal from a base station), the UE measures the power of the downlink reference signal. Downlink reference signals are carried by multiples of specific Resource Elements (RE). The downlink reference signal RE position and downlink reference signal sequence is based on the physical layer ID.

Because the number of available PCIDs are limited (e.g., in existing systems PCIDs can only have values between 0 and 503), PCID reuse is required in a cellular network. PCIDs are typically assigned manually (e.g., by an operator) when a sector is brought into service. However, when neighboring sectors use the same PCID, a collision can occur when user equipment (UE) attempts to connect to one of the sectors. Similarly, even if there is not a PCID collision, neighboring sectors may use the same physical layer ID and thus the same positions for transmitting their downlink reference signals. As a result, downlink reference signals of neighboring sectors may have time-frequency collision.

SUMMARY

In an aspect, data characterizing a sector to assign a physical cell identifier (PCID) is received, the sector being associated with a base station in a communications network. A reuse distance for each of the PCIDs in the set of PCIDs presently available to the sector for assignment is determined based on a set of PCIDs presently available to the sector for assignment. The reuse distance is a distance between the sector and a nearest sector having the PCID. A PCID having a largest reuse distance of PCIDs having a physical layer identifier (ID) being different from a physical layer ID of at least another sector associated with the base station is selected based on the determined reuse distance for each PCID in the set of PCIDs presently available to the sector for assignment. The selected PCID is assigned to the sector.

One or more of the following features can be included in any feasible combination. For example, PCIDs not presently used in the network but presently available to the sector for assignment may not be selected to limit the number of PCIDs used in the network. The selected PCID can be part of a PCID group in which one or more other PCID group numbers are assigned to one or more additional respective sectors associated with the base station. At least one of the receiving, the determining, the selecting, and the assigning can be performed by an element management system of the network. The element management system can include a domain management server communicating with a network management layer and a network element layer. The element management system can manage one or more network elements.

A PCID of at least another sector in the communications network can be received. PCIDs of neighboring sectors and sectors that neighbor the neighbors of the sector to generate the set of PCIDs presently available to the sector for assignment can be removed from a set of all possible PCIDs. PCIDs not presently used in the network can be deprioritized in the set of PCIDs presently available to the sector for assignment. Data characterizing the sector to assign the PCID can be received as a result of a PCID collision or the sector initiating service. The selected PCID can have a largest reuse distance of PCIDs having a downlink reference signal being different from a downlink reference signal of at least another sector associated with the base station.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU)."

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

In some implementations, the current subject matter relates to allocation and assignment of PCIDs in a cellular network in an automatic fashion. The current subject matter can allow assignment of PCIDs in a manner that can reduce PCID collisions and downlink reference signal time-frequency collisions while prioritizing large reuse distances (e.g., the current subject matter can allocate PCIDs to prioritize larger distances between sectors using the same PCID). In some implementations, the current subject matter can conserve the number of PCIDs utilized by a network or portion of a network by not preferring PCIDs that the network is not currently utilizing.

In some implementations, a PCID can be selected and assigned according to at least one of the following prioritized strategies: (1) assign an entire PCID group if possible (to all sectors of a base station if all sectors need PCID assignment); (2) assign a partial PICD group if possible (to more than 1 sector of a base station if more than one sector needs a PCID assignment); (3) assign a single PCID to complete a PCID group for the base station if possible (when base station already has sectors belonging to PCID group); (4) assign a single PCID so sectors of the base station have different physical layer IDs (and thus positions for their downlink reference signal transmission), hence avoiding interference (e.g., modulus 3 values); and (5) if the prior steps are unsuccessful, assign a PCID according to another criteria (e.g., can be any arbitrary PCID).

Figure 1:
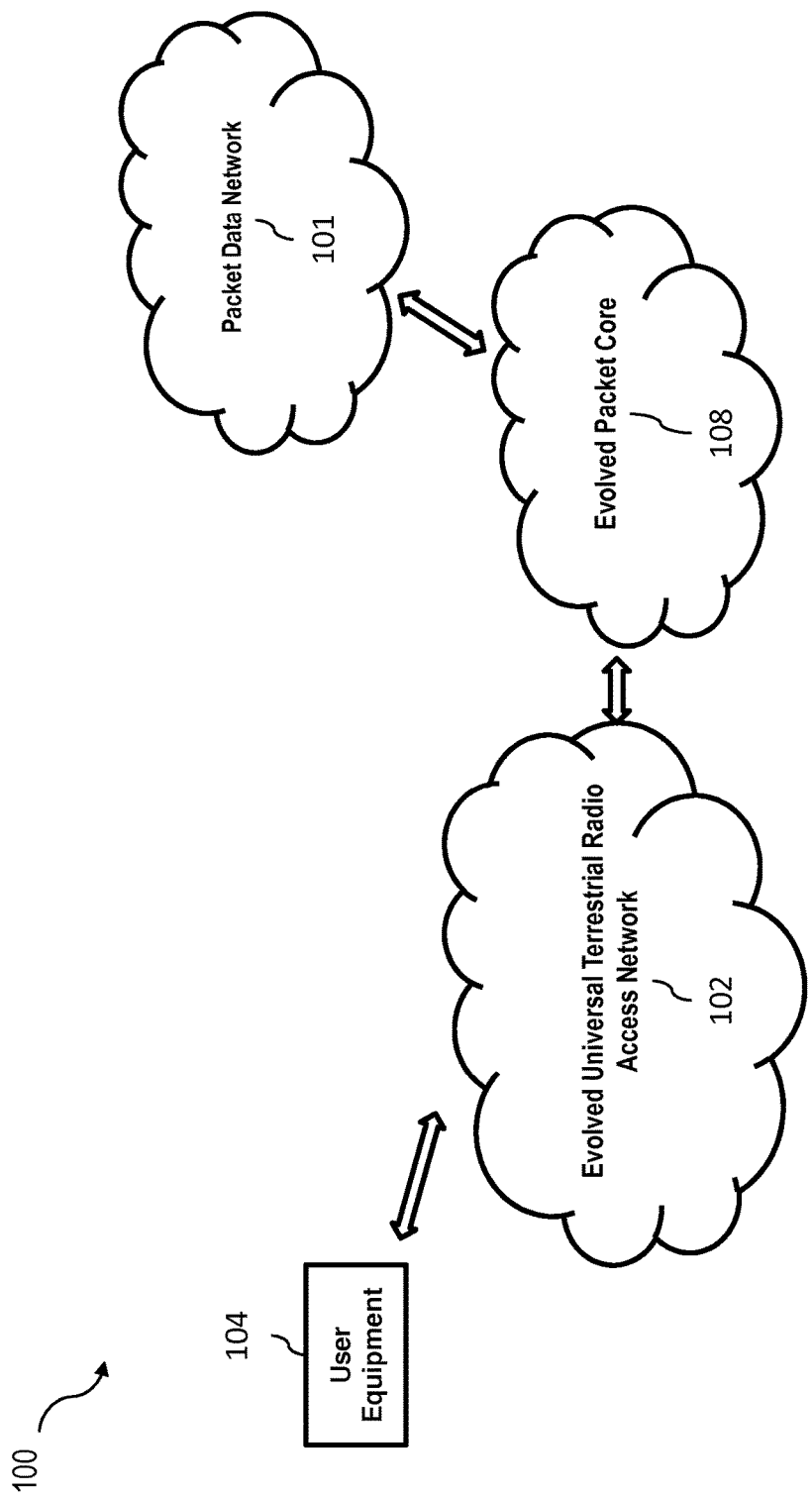
FIGS. 1 and 2 illustrate an exemplary conventional communication system along with its various components.
Figure 2:
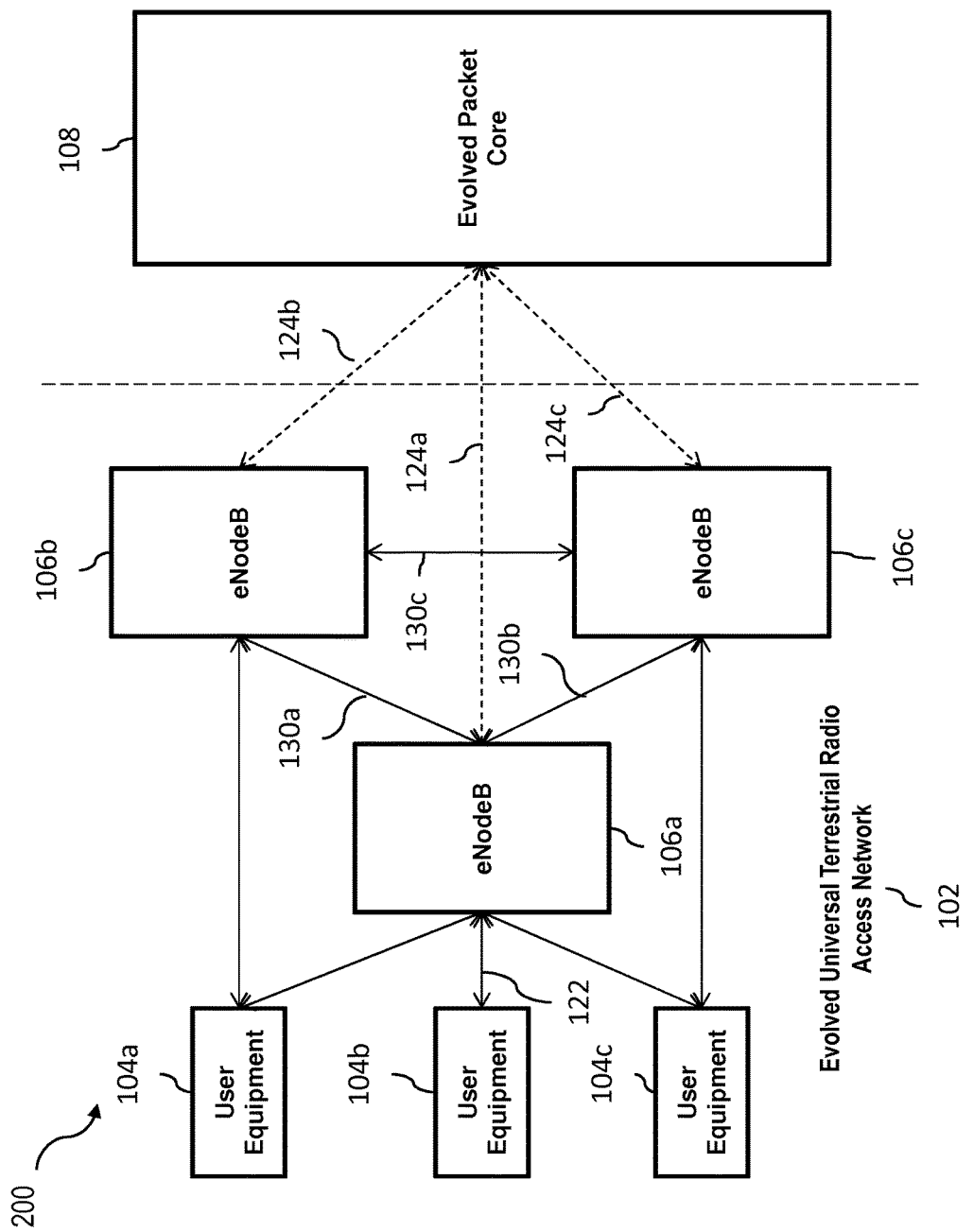

FIGS. 1 and 2 illustrate an exemplary conventional long-term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

As shown in FIG. 1, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 2) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility, and services for the user equipment 104.

FIG. 1 illustrates an example network 100. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 2, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME. In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 2, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane and the other for the user plane.

Figure 3:
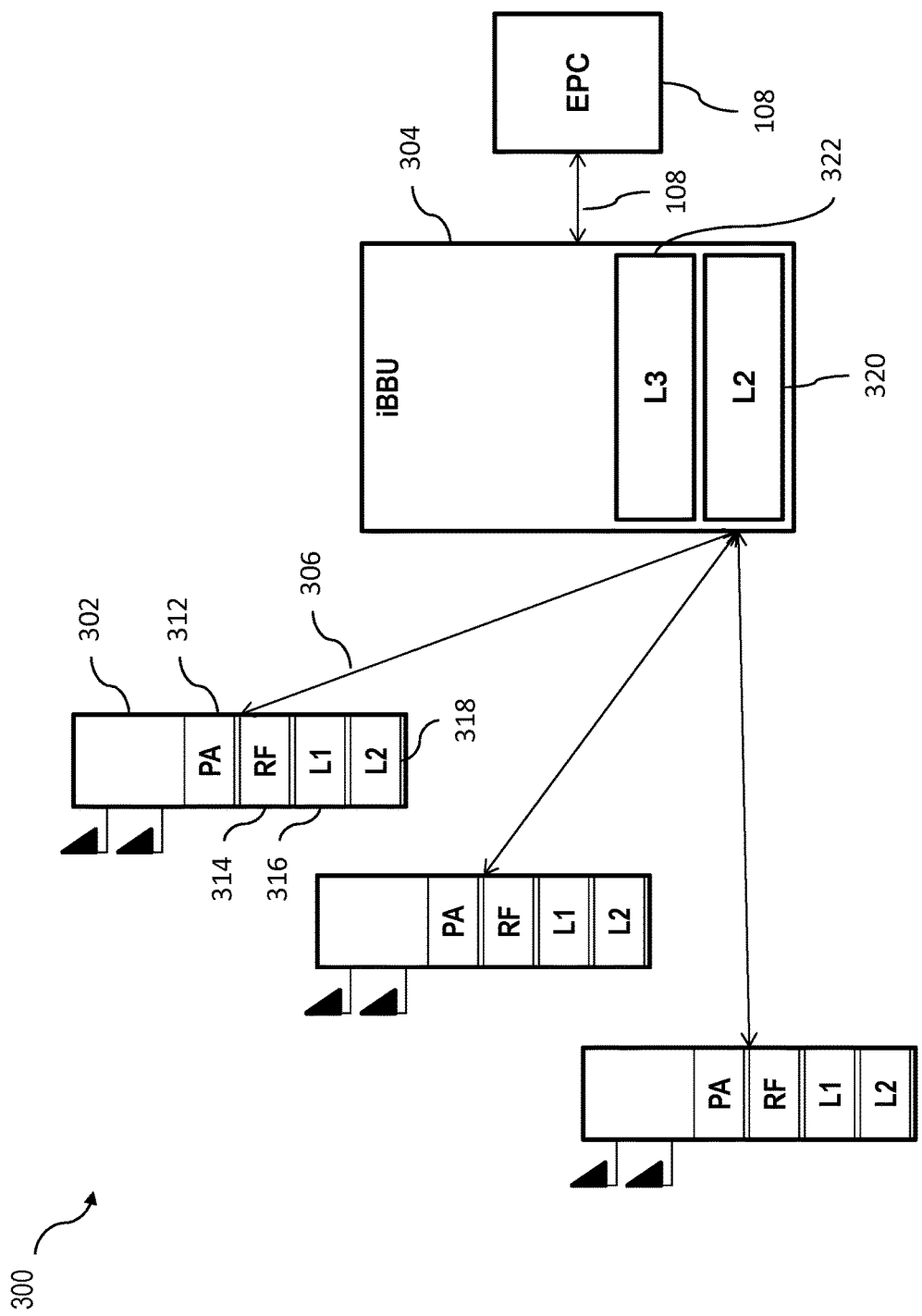
FIG. 3 illustrates an exemplary system, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to an evolved packet core ("EPC") using backhaul ("BH") communication 108. The user equipment (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with radio link control ("RLC") and a packet data convergence protocol ("PDCP"). The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

In some implementations, the system 300 can form part of an evolved Node B ("eNodeB" or "eNB") and there may be a plurality of eNBs interconnected with one another using an interface (e.g., X2). The interface can be established between two eNodeBs in order to provide an exchange of signals, which can include a load- or interference-related information as well as handover-related information. The eNodeBs can communicate with the evolved packet core EPC 108

In some implementations, the system 300 can implement automatic allocation of PCID. The current subject matter can operate to allocate PCIDs, for example, when: 1) bringing a new node into service with one or more sectors; 2) adding a new sector to an existing node; 3) returning a sector or node to service after a schedule outage; 4) returning a sector or node to service after an unscheduled outage; and 5) a PCID conflict (e.g., collision and/or confusion) is identified.

Figure 4:
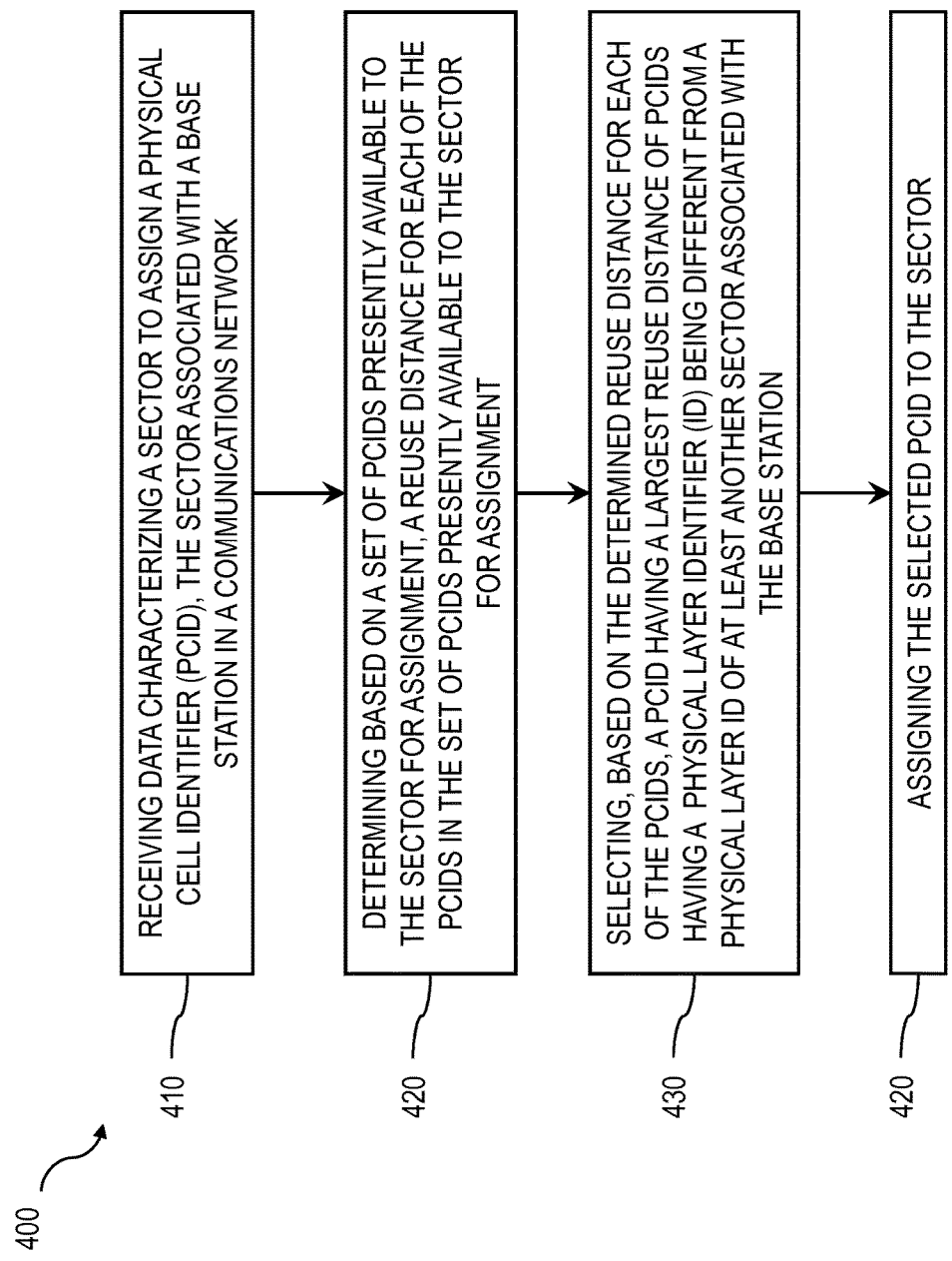
FIG. 4 is a process flow diagram illustrating an exemplary process for allocating one or more PCIDs in a cellular network, according to some implementations of the current subject matter.

FIG. 4 is a process flow diagram illustrating an exemplary process 400 for allocating one or more PCIDs in a cellular network, according to some implementations of the current subject matter. The allocation can occur, for example, after a PCID collision is detected and/or when bringing one or more sectors into (or back to) service. In some implementations, the process 400 can provide for assignment of PCIDs in a manner that reduces PCID collisions and downlink reference signal collisions while prioritizing large reuse distances.

At 410, data identifying a sector ready for assignment or allocation of a PCID can be received. In some implementations, the network can be bring the sector into service (and/or back to service) or can have detected a PCID collision and determined that a PCID reassignment is necessary. The sector can be a part of a base station, such as an eNodeB, having multiple sectors (for example, it is typical that a base station can have 3 sectors).

PCIDs that have been assigned to other sectors in the network can also be received. For example, the base station can receive, on the X2 interface from each of the neighboring base stations, the PCID for corresponding neighboring sectors in the network and/or a portion of the network. In some implementations, the base station can identify the PCID of neighboring sectors directly over the air interface 122. A list or set of PCIDs presently available for assignment to the sector can be determined by removing from a set of all possible PCIDs (e.g., 0, 1, 2, . . . , 503) the PCIDs of neighboring sectors. In some implementations, the neighboring sectors of the neighboring sectors can also be removed. This constraint can reduce the likelihood of future PCID collisions. Thus, the set of PCIDs presently available to the sector for assignment can include PCIDs that are used in the network by other sectors (e.g., sectors that are immediate and possible neighbors and the sector who is undergoing PCID assignment/allocation) and PCIDs that are not used by any sector in the network.

In some implementations, any PCIDs that are not presently used by another sector can be deprioritized from the set of PCIDs presently available to the sector thereby conserving the number of overall PCIDs used by the network. Thus, PCIDs that are used elsewhere in the network and are available for assignment (e.g., satisfy criteria for assignment) to the sector will be selected over PCIDs that are not used in the network. By conserving the number of PCIDs used by the network or a portion of the network, the process 400 can maintain unused PCIDs available for future network expansion.

Using the set of PCIDs presently available to the sector for assignment, a reuse distance for each of the available PCIDs can be determined, at 420. If a given PCID is not presently assigned to another sector in the network, it can have no reuse distance (e.g., not applicable). If the PCID is assigned to a different sector in the network, the reuse distance can be the distance from the base station of the different sector to the base station of the sector being allocated, although other methods of computing reuse distance are possible. If multiple other sectors in the network use the given PCID, then the closest (e.g., nearest) sector is used to determine the reuse distance.

Using the reuse distance for each of the PCIDs that are available to the sector for assignment, a PCID can be selected for allocation to the sector, at 430. The PCID can be selected so that it has the largest reuse distance of PCIDs that have different physical layer IDs (e.g., so they have different positions for their downlink reference signals) than other sectors of the base station (e.g., in an implementation, the physical layer ID and downlink reference signal are different when the modulus 3 values of the physical layer ID are different). In some implementations, the selected PCID has a largest reuse distance of PCIDs having a downlink reference signal being different from a downlink reference signal of at least another sector associated with the base station. In some implementations, PCIDs will not be assigned unless they satisfy an acceptable (e.g., minimum) reuse distance requirement. In an implementation, the residual list is arranged in decreasing order of re-use distance, the pcid with the maximum possible re-use distance that also satisfies these conditions is selected. If no PCID satisfies these conditions, unused PCIDs may be used. At 440, the selected PCID can be assigned to the sector.

In some implementations, the sector undergoing PCID allocation can belong to a base station having other sectors that are assigned PCIDs belonging to the same PCID group. When possible, the process 400 can select a PCID such that the sectors associated with the base station form a complete PCID group (e.g., three sectors having physical ID number values of 0, 1, and 2 with equal group numbers).

In some implementations, the sector undergoing PCID allocation can belong to a base station having other sectors that also do not have an assigned PCID (or need their PCID reassigned). The process 400 can select a complete PCID group that has all group members available for allocation (e.g., PCIDs corresponding to physical ID number values of 0, 1, and 2 with equal group number). By assigning the entire group to sectors associated with a common base station, downlink reference signal time-frequency collision may be avoided.

In some implementations, the process 400 can be performed by an element management system (EMS) of the network. The element management system operates as a central PCID allocation authority for each sector on the network. An element management system can manage one or more of a specific type of telecommunications network element. Typically, the EMS manages the functions and capabilities within each element but does not manage the traffic between different elements in the network. To support management of the traffic between itself and other elements, the EMS communicates upward to higher-level network management systems (NMS) as described in the telecommunications management network layered model. The EMS provides for telecommunications managed network (TMN)-layered operations support system (OSS) architectures.

Figure 7:
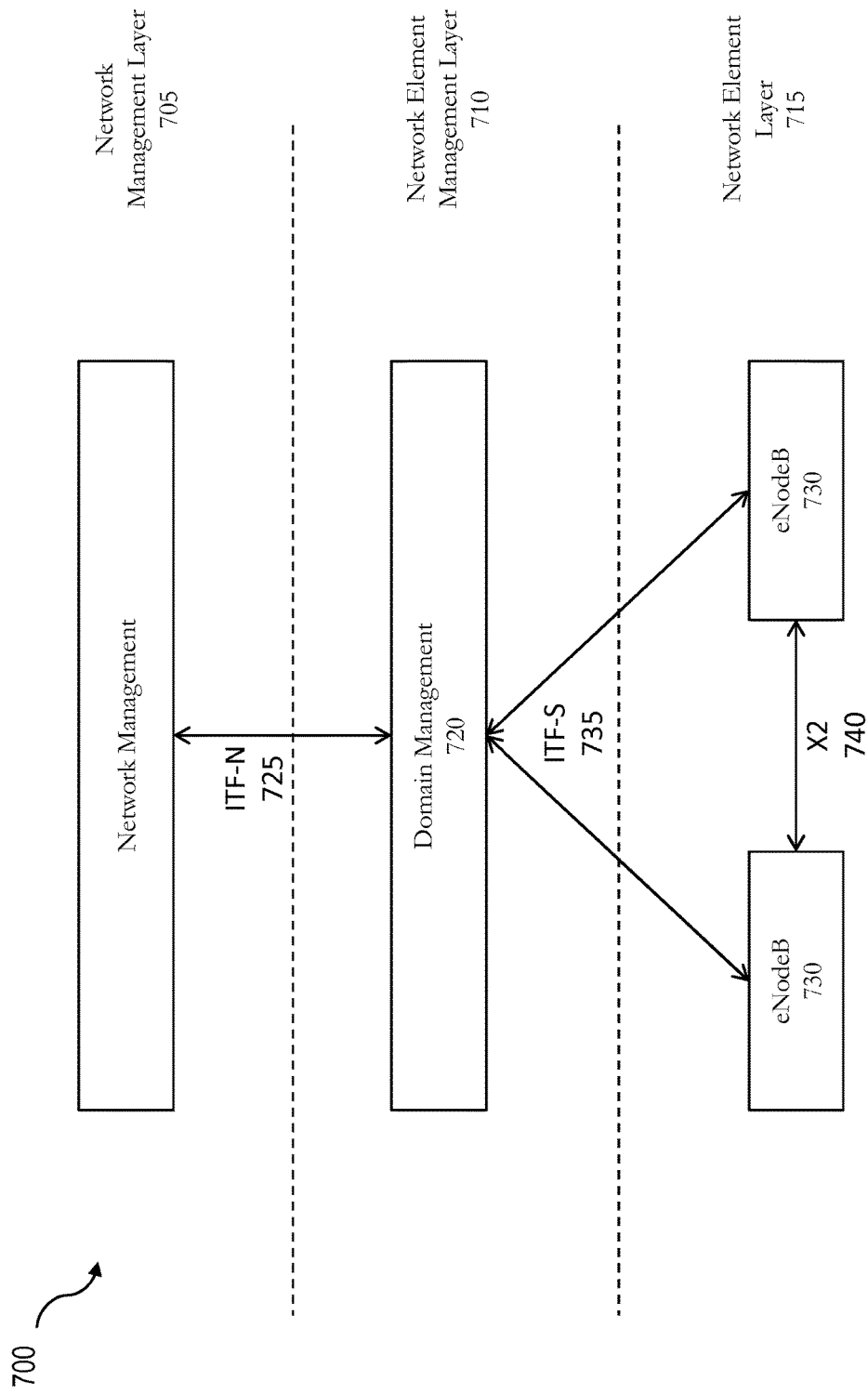
FIG. 7 is a system block diagram illustrating logical organization of an example TMN-layered network.

FIG. 7 is a system block diagram illustrating logical organization of an example TMN-layered network 700. The TMN-layered network 700 includes a network management layer 705, a network element management layer 710, and a network element layer 715. The network management layer 705 includes centralized self-organizing network (SON) functionality. The network element management layer 710 includes a domain management server 720 communicating with the network management layer 705 via an ITF-N interface 725. The domain management server 720 can also include centralized SON functionality. The network element layer 715 includes one or more eNBs 730 communicating with the network element management layer 710 via an ITF-S interface 735. The eNBs 730 can include decentralized SON functionality and can communicate via the X2 interface 740. While only one domain management server 720 and two eNBs 730 are illustrated, it should be understood that a network can include many domain management servers each with numerous associated eNBs.

In an example implementation, the process 400 is implemented on a domain management server 720 communicating via the ITF-S interface 735 with the eNBs 730. More specifically, the domain management server 720 can communicate with iBBUs associated with each eNB 730, although it is contemplated that the current subject matter is not limited to eNBs having iBBUs. In the example implementation, the domain management server 720 includes the following minimum EMS hardware configuration for managing hundreds of sites: DELL PowerEdge R320 with CPU: Intel® Xeon® CPU E5-1410 0 @ 2.80 GHz X 1 (6 cores option with hyper threading), RAM: 1333 MHz 8192 MB DIMM X 2, HDD: 100G SSD X 1, 2 TB SATA HDD X 1, and Two Gigabit Ethernet ports.

In some implementations, a single PCID is allocated at a time (e.g., the PCIDs for other sectors are assumed fixed for purposes of the process 400). In some implementations, all or less than all sectors associated with a given base station can be allocated at the same time, for example, when bringing multiple sectors online and an entire group of PCIDs is available for allocation. In some implementations, the process 400 can be performed by each base station in the network in a serial manner, for example, according to a queue such that a first base station allocates one or more associated sectors that require PCID allocation and, once complete, a second base station allocates one or more associated sectors. The process 400 can repeat until all sectors in the network that require PCID allocation have been assigned a PCID according to the current subject matter.

Figure 5A:
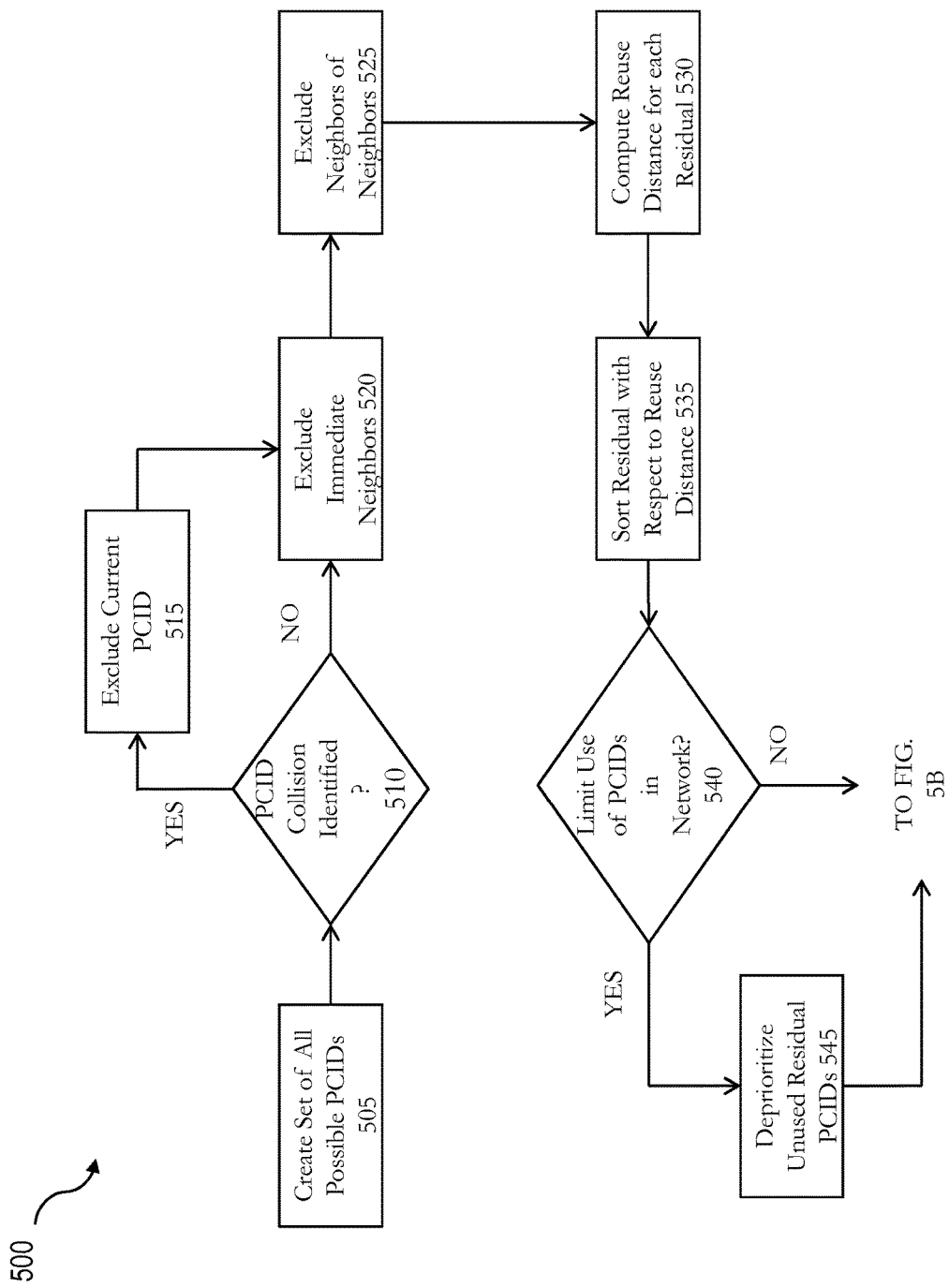
FIGS. 5A-C illustrate a process flow diagram for allocating one or more PCIDs, according to some implementations of the current subject matter.
Figure 5B:
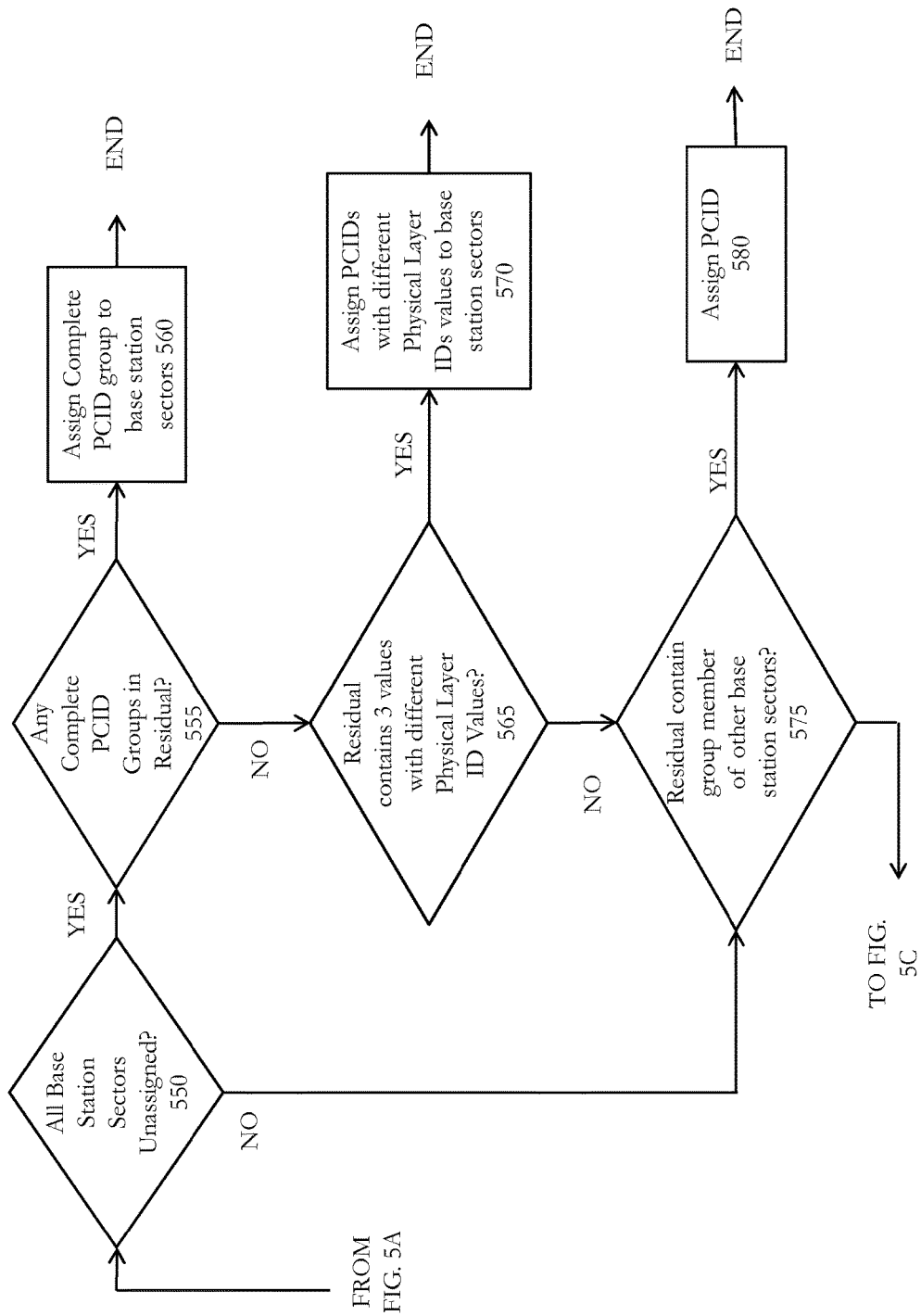
Figure 5C:
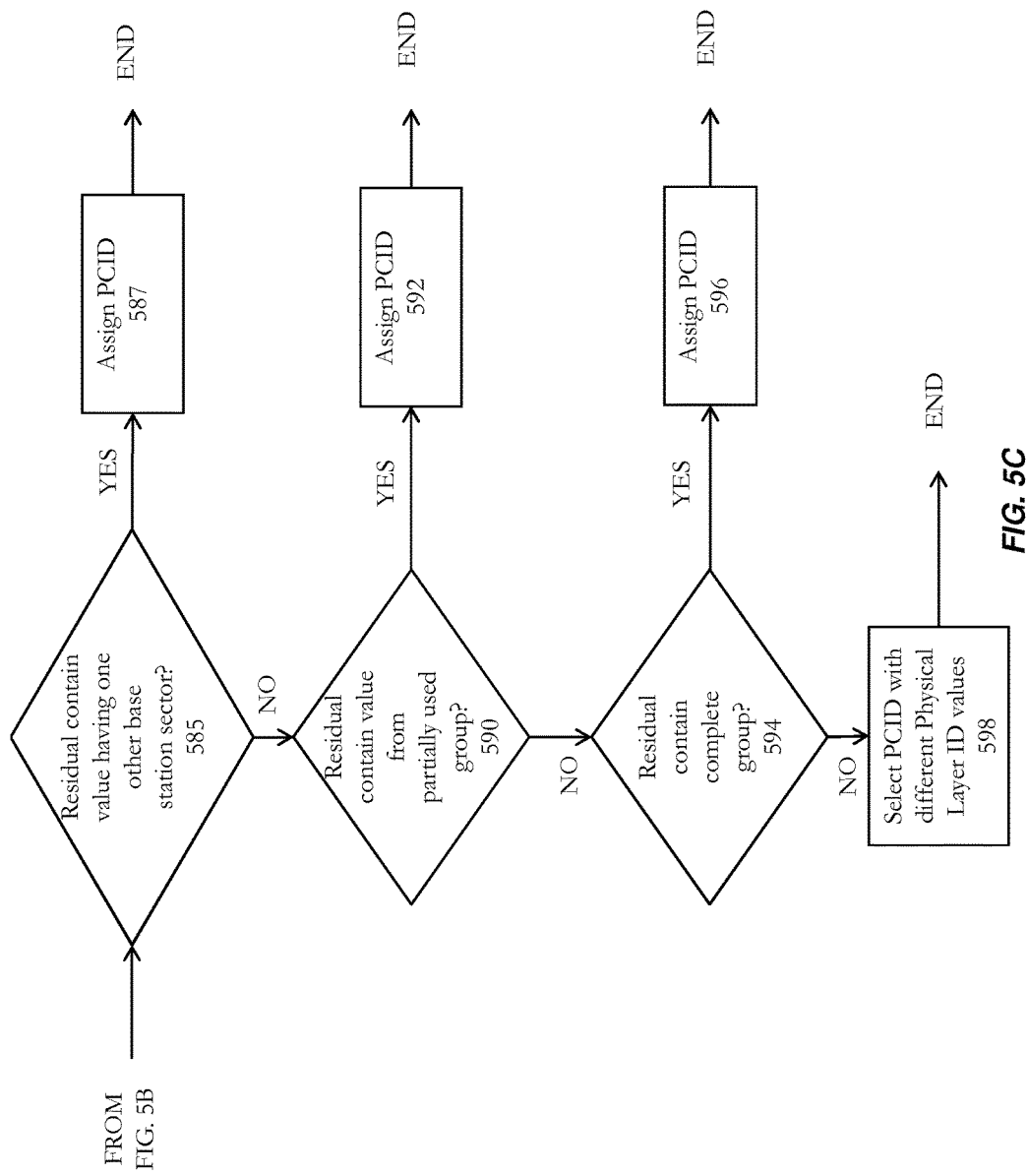

FIGS. 5A-C illustrate a flow diagram of an exemplary process 500 for allocating a PCID, according to some implementations of the current subject matter. For the purposes of illustration only, it is assumed that each base station is an eNodeB having three sectors. At 505, a set of all possible PCIDs can be created. For example, since typical networks have physical layer IDs with values between zero and two, and physical layer group numbers with values between 0 and 167, the set of all possible PCIDs is (0, 1, 2, . . . , 503). At 510, it can be determined whether the process 500 is operating in response to a detection of a PCID collision in the network. If a collision has occurred, then, the sector's current PCID can be removed from the set of all possible PCIDs (the sector's current PCID previously resulted in a collision and so is removed to prevent re-assigning the same PCID), at 515.

At 520, PCIDs assigned to any immediate neighboring sectors can be excluded. At 525, neighbors of the immediate neighboring sectors can also be excluded. In some implementations, step 525 can be optional. The modified set of PCIDs (e.g., those PCIDs that have not been excluded) are herein referred to as residual PCIDs and/or the residual set. At 530, the reuse distance for each residual PCID in the residual set can be determined. If a residual PCID is not used elsewhere in the network, the reuse distance may be considered not applicable, infinite, zero, or the like depending on desired behavior of the allocation process. For example, if the residual distance is considered infinite, then the process 500 can favor selecting unused PCIDs. If the residual distance is considered zero, then the process 500 can favor selecting used PCIDs over unused PCIDs.

At 535, the residual set can be sorted according to the determined reuse distance. In some implementations, the residual set can be sorted based on descending values of reuse distance (e.g., highest reuse distance first and lowest reuse distance last). In some implementations, PCIDs with reuse distances below a predefined minimum reuse distance can be removed from the sorted residual set. At 540, it can be determined whether the process 500 will limit the use of PCIDs in the network. A flag set by a network operator can specify whether to limit the user of PCIDs in the network, for example. If the number of PCIDs to be allocated in the network is to be limited, the PCIDs that are not presently used by another sector in the network can be deprioritized in the residual set, at 545. This can be performed, for example, by reordering the residual set and/or creating another set including the not presently used PCIDs. Other implementations are possible. By conserving the number of PCIDs used by the network or a portion of the network, the process 500 can maintain unused PCIDs available for future expansion.

At 550, it can be determined whether all sectors associated with the eNodeB of the sector undergoing PCID assignment are unassigned and/or require reassignment. If all sectors of the associated eNodeB are unassigned and/or require reassignment, then all unassigned sectors associated with the eNodeB can be allocated together (e.g., coordinating their assignment). Assigning all sectors of an eNodeB in a coordinated fashion can allow for the sectors of the eNodeB to be assigned a complete PCID group.

If all sectors of the associated eNodeB are unassigned and/or require reassignment then, the process 500 can determine whether the residual set includes any full PCID groups, at 555. If so, then the first PCID from the sorted residual set that has all members of its PCID group in the residual set can be assigned to the sector, at 560. The remaining eNodeB sectors can also be assigned to the remaining members of the PCID group.

If not, then all sectors of the associated eNodeB can be unassigned and/or require reassignment then, the process 500 can determine whether there are PCIDs in the sorted residual set with different physical layer IDs (e.g., different modulus 3 values), at 565. If so, then the PCIDs having different physical layer ID values can be selected from the sorted residual set and assigned to the sectors of the associated eNodeB, at 570. When multiple groupings of PCIDs having different physical layer ID (e.g., different modulus 3 values) values are in the sorted residual set, then these PCIDs can be selected according to the greatest reuse distance.

If there are no PCIDs in the sorted residual set with different physical layer ID values, then process 500 can determine whether one or more of the other two eNodeB sectors have assigned PCIDs (e.g., all sectors associated with the eNodeB are not unassigned), at 575. At 575, whether there exists a value in the residual set having same PCID group as both other sectors in the associated eNodeB can be determined. If so, the value that belongs to the group is assigned as the sector PCID, at 580. If not, the process can determine whether there exists a value in the residual set having same PCID group as one other eNodeB sector assigned PCID, at 585. If so, the value that belongs to the same group can be assigned as the sector PCID, at 587. If not, the process 500 can determine whether there exists a PCID in the residual set from a partially used group (e.g., one or two members of a PCID group are in residual, but not all three), at 590. If so, then the first (e.g., highest value having the greatest reuse distance) PCID in the sorted residual and meeting the above criteria can be assigned to the sector, at 592.

If there does not exist a PCID in the residual set that is from a partially used group, then the process 500 can determine whether a complete PCID group exists in the residual set, at 594. If so, then the first (e.g., highest value having the greatest reuse distance) PCID in the sorted residual and meeting the above criteria can be assigned to the sector, at 596. If not, a PCID can be selected and assigned with a different physical layer ID values (e.g., modulus 3 value) from those in the associated base station, at 598. If at any point, the residual is empty, then the process 500 can select an arbitrary PCID from the residual set.

Thus, as described above, the process 500 can include generating a list of PCIDs available for assignment and selecting a value according to a number of prioritized strategies. More specifically, starting with a set of all possible PCID values (e.g., 0, 1, . . . , 503) (at 505), constraints can be applied to remove PCIDs from the set of all possible PCID values (at 510, 515, 520, 525, 540 and 545). The non-excluded PCID values can be the residual set, the contents of which can be residual PCIDs. The residual set can be sorted (at 530 and 535) to allow for selection and assignment of PCIDs that prioritizes greater reuse distances. A PCID can be selected and assigned from the residual set according to at least one of the following prioritized strategies (at 555 to 598): (1) assign an entire PCID group if possible (to all sectors of a base station if all sectors need PCID assignment); (2) assign a partial PCID group if possible (to more than 1 sector of a base station if more than one sector needs a PCID assignment); (3) assign a single PCID to complete a group for the base station if possible (when base station already has sectors belonging to PCID group); (4) assign a single PCID so sectors of the base station have different physical layer IDs (e.g., modulus 3 values); and (5) if the prior steps are unsuccessful, assign a PCID according to another criteria (e.g., can be any arbitrary PCID in the residual).

Figure 6:
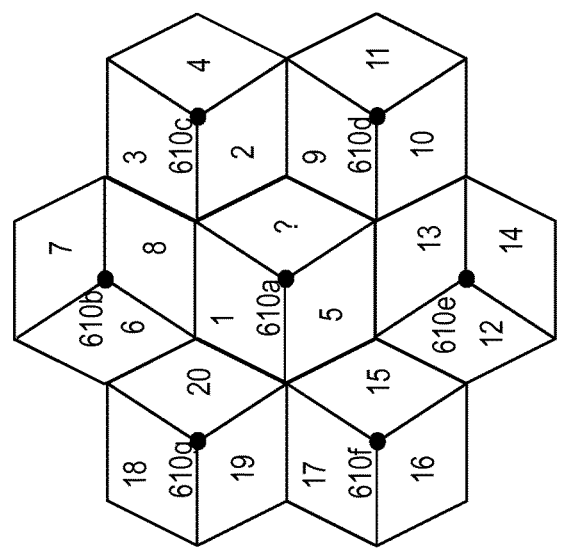
FIG. 6 is a sector block diagram of an exemplary network with a sector undergoing PCID allocation, according to some implementations of the current subject matter.

FIG. 6 is a sector block diagram of an exemplary network 600 with a sector 605 undergoing PCID allocation, according to some implementations of the current subject matter. The network can include multiple base stations 610*a-h*, each having three associated sectors. Each sector can be denoted by its assigned PCID value, except sector 605, which can be undergoing allocation because the sector is being brought back to service. The following example illustrates the actual values of the various aspects of the process of FIGS. 5A-C. Initially, a set of all possible PCIDs is generated (at 505). The set of all possible PCIDs can be described as:

All possible PCIDs=[0, 1, 2, . . . , 503]

PCIDs of immediate neighboring sectors are excluded (at 520). In this example, neighbors of neighbors are not excluded (at 525). The neighbors and resultant set can be described as:

Neighbors=[1, 2, 3, 5, 8, 9, 10, 13]
Residual set=[0, 4, 6, 7, 11, 12, 14, 15, 16 17, 18, 19, 20, . . . , 503]

For each residual PCID, the nearest reuse distance is computed (at 530) and the residual is sorted according to the reuse distance (at 535). The example reuse and sorted residual set can be described as:

Residual set=[0, 4, 6, 7, 11, 12, 14, 15, 16 17, 18, 19, 20, 21, 22, . . . , 503]
Reuse distance=[na, 2.1, 1.1, 3.5, 3.5, 2.1, 3.1, 1.5, 3.6, 3.5, 3.8, 4.0, 4.1, na, na, . . . , na]
Sorted Residual Set=[503, . . . , 21, 0, 20, 29, 18, 16, 17, 11, 7, 14, 12, 4, 15, 6]

Assuming for the example that the process will be limiting PCIDs use over the network (or a portion of the network), any PCIDs not used in the network (or portion of the network) can be deprioritized in the residual set (at 545) by reordering the sorted residual set (to place them at the end of the sorted residual set). The resultant residual set can be described as:

Sorted Residual Set=[20, 19, 18, 16, 17, 11, 7, 14, 12, 4, 15, 6, . . . , 503]

Assuming an acceptable reuse distance of 1.0, no PCIDs need to be removed from the sorted residual set.

Since not all sectors associated with base station 605*a* are unassigned (at 550), and there is a residual PCID belonging to one of the other base station 605*a* sectors PCID groups (at 575 and 585), the sector can be assigned a PCID from a partial group (at 580). More specifically, the other sectors associated with base station 605*a* can have PCID values of 1 and 5, (corresponding to group numbers 0 and 1, respectively) and residual PCID 4 can also belong to the same group as PCID 5 (both PCID 4 and 5 have a group number of 1), so the sector being allocated can be assigned PCID 4. This scheme can preserve complete groups for potential new base stations.

The subject matter described herein can provide many technical advantages. For example, unassigned complete PCID groups are preserved, if possible, for new base station deployments. The reuse distance is maximized under the constraints that no neighboring sectors have the same PCID. Downlink reference signal collisions are reduced.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data characterizing a sector to assign a physical cell identifier (PCID), the sector being associated with a base station in a communications network;
   determining, based on a set of PCIDs presently available to the sector for assignment, a reuse distance for each of the PCIDs in the set of PCIDs presently available to the sector for assignment, the reuse distance being a distance between the sector and a nearest sector having the PCID;
   selecting, based on the determined reuse distance for each PCID in the set of PCIDs presently available to the sector for assignment and based on a physical layer identifier (ID) of each PCID in the set of PCIDs presently available to the sector for assignment, a PCID having a largest reuse distance of PCIDs having a physical layer ID that is different from a physical layer ID of at least another sector associated with the base station; and
   assigning the selected PCID to the sector.

2. The method of claim 1, wherein PCIDs not presently used in the network but presently available to the sector for assignment are not selected to limit the number of PCIDs used in the network.

3. The method of claim 1, wherein the selected PCID is part of a PCID group in which one or more other PCID group numbers are assigned to one or more additional respective sectors associated with the base station.

4. The method of claim 1, wherein at least one of the receiving, the determining, the selecting, and the assigning are performed by an element management system of the network, the element management system including a domain management server communicating with a network management layer and a network element layer, the element management system managing one or more network elements.

5. The method of claim 1, further comprising:
   receiving a PCID of at least another sector in the communications network.

6. The method of claim 1, further comprising:
   removing, from a set of all possible PCIDs, PCIDs of neighboring sectors and sectors that neighbor the neighbors of the sector to generate the set of PCIDs presently available to the sector for assignment.

7. The method of claim 1, wherein PCIDs not presently used in the network are deprioritized in the set of PCIDs presently available to the sector for assignment.

8. The method of claim 1, wherein the data characterizing the sector to assign the PCID is received as a result of a PCID collision or the sector initiating service.

9. The method of claim 1, wherein the selected PCID has a largest reuse distance of PCIDs having a downlink reference signal being different from a downlink reference signal of at least another sector associated with the base station.

10. A system comprising:
    at least one data processor;
    memory storing instructions which, when executed by the at least one data processor, causes the at least one data processor to perform operations comprising:
       receiving data characterizing a sector to assign a physical cell identifier (PCID), the sector being associated with a base station in a communications network;
       determining, based on a set of PCIDs presently available to the sector for assignment, a reuse distance for each of the PCIDs in the set of PCIDs presently available to the sector for assignment, the reuse distance being a distance between the sector and a nearest sector having the PCID;

selecting, based on the determined reuse distance for each PCID in the set of PCIDs presently available to the sector for assignment and based on a physical layer identifier (ID) of each PCID in the set of PCIDs presently available to the sector for assignment, a PCID having a largest reuse distance of PCIDs having a physical layer ID that is different from a physical layer ID of at least another sector associated with the base station; and assigning the selected PCID to the sector.

11. The system of claim 10, wherein PCIDs not presently used in the network but presently available to the sector for assignment are not selected to limit the number of PCIDs used in the network.

12. The system of claim 10, wherein the selected PCID is part of a PCID group in which one or more other PCID group numbers are assigned to one or more additional respective sectors associated with the base station.

13. The system of claim 10, wherein at least one of the receiving, the determining, the selecting, and the assigning are performed by an element management system of the network, the element management system including a domain management server communicating with a network management layer and a network element layer, the element management system managing one or more network elements.

14. The system of claim 10, the operations further comprising:
receiving a PCID of at least another sector in the communications network.

15. The system of claim 10, the operations further comprising:
removing, from a set of all possible PCIDs, PCIDs of neighboring sectors and sectors that neighbor the neighbors of the sector to generate the set of PCIDs presently available to the sector for assignment.

16. The system of claim 10, wherein PCIDs not presently used in the network are deprioritized in the set of PCIDs presently available to the sector for assignment.

17. The system of claim 10, wherein the data characterizing the sector to assign the PCID is received as a result of a PCID collision or the sector initiating service.

18. The system of claim 10, wherein the selected PCID has a largest reuse distance of PCIDs having a downlink reference signal being different from a downlink reference signal of at least another sector associated with the base station.

19. A non-transitory computer program product storing instructions, which when executed by at least one data processor of at least one computing system, implement a method comprising:
receiving data characterizing a sector to assign a physical cell identifier (PCID), the sector being associated with a base station in a communications network;
determining, based on a set of PCIDs presently available to the sector for assignment, a reuse distance for each of the PCIDs in the set of PCIDs presently available to the sector for assignment, the reuse distance being a distance between the sector and a nearest sector having the PCID;
selecting, based on the determined reuse distance for each PCID in the set of PCIDs presently available to the sector for assignment and based on a physical layer identifier (ID) of each PCID in the set of PCIDs presently available to the sector for assignment, a PCID having a largest reuse distance of PCIDs having a physical layer ID that is different from a physical layer ID of at least another sector associated with the base station; and assigning the selected PCID to the sector.

20. The computer program product of claim 19, wherein PCIDs not presently used in the network but presently available to the sector for assignment are not selected to limit the number of PCIDs used in the network.

21. The computer program product of claim 19, wherein the selected PCID is part of a PCID group in which one or more other PCID group numbers are assigned to one or more additional respective sectors associated with the base station.

22. The computer program product of claim 19, wherein at least one of the receiving, the determining, the selecting, and the assigning are performed by an element management system of the network, the element management system including a domain management server communicating with a network management layer and a network element layer, the element management system managing one or more network elements.

23. The computer program product of claim 19, the method further comprising:
receiving a PCID of at least another sector in the communications network.

24. The computer program product of claim 19, the method further comprising:
removing, from a set of all possible PCIDs, PCIDs of neighboring sectors and sectors that neighbor the neighbors of the sector to generate the set of PCIDs presently available to the sector for assignment.

25. The computer program product of claim 19, wherein PCIDs not presently used in the network are deprioritized in the set of PCIDs presently available to the sector for assignment.

26. The computer program product of claim 19, wherein the data characterizing the sector to assign the PCID is received as a result of a PCID collision or the sector initiating service.

27. The computer program product of claim 19, wherein the selected PCID has a largest reuse distance of PCIDs having a downlink reference signal being different from a downlink reference signal of at least another sector associated with the base station.

28. The method of claim 1, further comprising:
comparing a modulus three value of the physical layer ID of the selected PCID to a modulus three value of at least another sector associated with the base station to determine that the physical layer ID of the selected PCID is different from the physical layer ID of the at least another sector associated with the base station.

29. The method of claim 9, wherein the downlink reference signal of the selected PCID is different from the downlink reference signal of at least another sector associated with the base station when modulus three values of their respective physical layer IDs are different.

30. The system of claim 10, the operations further comprising:
comparing a modulus three value of the physical layer ID of the selected PCID to a modulus three value of at least another sector associated with the base station to determine that the physical layer ID of the selected PCID is different from the physical layer ID of the at least another sector associated with the base station.

31. The system of claim 18, wherein the downlink reference signal of the selected PCID is different from the downlink reference signal of at least another sector associated with the base station when modulus three values of their respective physical layer IDs are different.

32. The computer program product of claim 19, the operations further comprising:
   comparing a modulus three value of the physical layer ID of the selected PCID to a modulus three value of at least another sector associated with the base station to determine that the physical layer ID of the selected PCID is different from the physical layer ID of the at least another sector associated with the base station.

33. The computer program product of claim 27, wherein the downlink reference signal of the selected PCID is different from the downlink reference signal of at least another sector associated with the base station when modulus three values of their respective physical layer IDs are different.

* * * * *